Nov. 24, 1970 — R. T. HEATH — 3,541,763
GAS DEHYDRATOR
Filed May 15, 1968 — 2 Sheets-Sheet 1

INVENTOR.
Rodney T. Heath
BY
Richard N. Law
ATTORNEY

Nov. 24, 1970   R. T. HEATH   3,541,763
GAS DEHYDRATOR
Filed May 15, 1968   2 Sheets-Sheet 2

INVENTOR.
Rodney T. Heath
BY
Richard D. Law
ATTORNEY

United States Patent Office 3,541,763
Patented Nov. 24, 1970

3,541,763
GAS DEHYDRATOR
Rodney T. Heath, Farmington, N. Mex., assignor to Olman Heath Co., Farmington, N. Mex.
Filed May 15, 1968, Ser. No. 729,213
Int. Cl. B01d *19/00*
U.S. Cl. 55—185                           6 Claims

ABSTRACT OF THE DISCLOSURE

A gas dehydrator using a liquid dehydrating agent, such as glycol, includes a contactor separator for the gas and liquid, and the contactor separator has a pair of series mounted concurrent contactor elements each with a following separator element, with the separator elements mounted within a separator shell. A double action piston pump injects dehydrating agent into the contactor elements.

---

Production from most gas wells is a mixture of gas, oil and water in varying portions. Generally, to make a saleable product of the gas, the liquids must be removed since few purchasers of gas, such as gas distributors, will accept gas containing more than about seven pounds of water per million feet of gas. The producer on the other hand desires to separate the oil from the gas since it is saleable separately as petroleum. Further, water in the gas may produce hydrates, which are ice-like materials, that form in constrictions, turns, valves, etc, and clog the pipe which reduces the gas flow, induces corrosion in the pipe lines, valves and other constrictions, may produce scale in tubing and on the surfaces of the gas handling equipment, and the like.

Conventionally, separators are used to separate the liquids from the gas, normally at the well head. Very little water vapor is removed in the commercially available separators which operate at ambient temperatures or higher. Low temperature separators have been used with varying degrees of success for the removal of water vapor, however, the equipment costs are high. Variables such as changes in gas pressure, emulsion formation, formation of hydrates, changes in ambient temperatures and the like can drastically effect the operation of the low temperature separators. Dehydrating equipment using a dehydrating agent, which may be either solid or liquid, are conventionally used in the gas industry. One commonly used dehydrator effectively uses diethylene or triethylene glycol which is contacted, as a lean glycol, with the gas to absorb the contained water vapor, and then separating the liquid from the gas. The water rich glycol is then passed to a reboiler to remove the water commonly called concentrating the glycol, and recovered water lean glycol is recycled back through the gas contact apparatus.

Glycol dehydrators are sensitive to changes in moisture in the gas stream as they operate at a predetermined glycol rate per unit flow of gas. Increased moisture decreases the moisture absorption power of the glycol, for example, a reduction in concentration of glycol with with water from 99 to 97 percent drastically reduces water absorption power of the glycol to the point where it has essentially no absorption power. Furthermore, conventional glycol dehydrators are very sensitive to slugs of liquid carried along with the gas flow and which drown the dehydrating unit making it generally inoperable for a period of time.

Included among the objects and advantages of the present invention is a gas dehydrator which is highly effective in water absorption and is very effective in minimum usage of the liquid absorbant.

Another object of the invention is to provide a compact dehydrator which includes an integral pair of series mounted concurrent contactor elements each with a following separator element mounted in a separator shell.

A further object of the invention is to provide a simplified double contact dehydrating apparatus of the liquid gas type, utilizing a single pump for introducing the contact liquid into two series mounted contact apparatus.

A still further object of the invention is to provide a pair of series mounted concurrent flow gas-liquid contactors having following separators all integrally mounted with a shell separator for effectively reducing water content of gas.

Another object of the invention is to provide a dehydrating system for the dehydration of natural gas.

These and other objects and advantages of the invention may be readily ascertained by referring to the following description and appended illustrations in which.

In general, the dehydrator of the invention comprises a pair of series mounted contactor-separator elements mounted with a separator shell. The absorbing liquid, which is normally glycol, is removed from a sump or reservoir in which it is collected from a reboiler, split into two streams one stream going to one of the series connected contactors and the other stream going to the other of the series connected contactors. Gas from an initial separator is passed concurrently with water-lean glycol through the first contact unit, water-rich glycol liquid is then separated from the mixture and the mixture is passed to a second contact apparatus for a second concurrent flow in contact with additional water lean glycol therein. The mixture from the second contact apparatus passes through another separator and the recovered gas is passed into a separator shell through a mist extractor and subsequently out into the producer line. The separated glycol from the first and second separators is pooled in a sump in the separator shell along with any carryover liquid recovered by the mist extractor, and all rich glycol is returned to a reboiler where water is removed from the glycol and the concentrated glycol is then passed back through the dehydrator unit. A conventional reboiler may be used, and, normally, gas from a conventional liquid separator is passed into the dehydrator unit.

Figure 1:
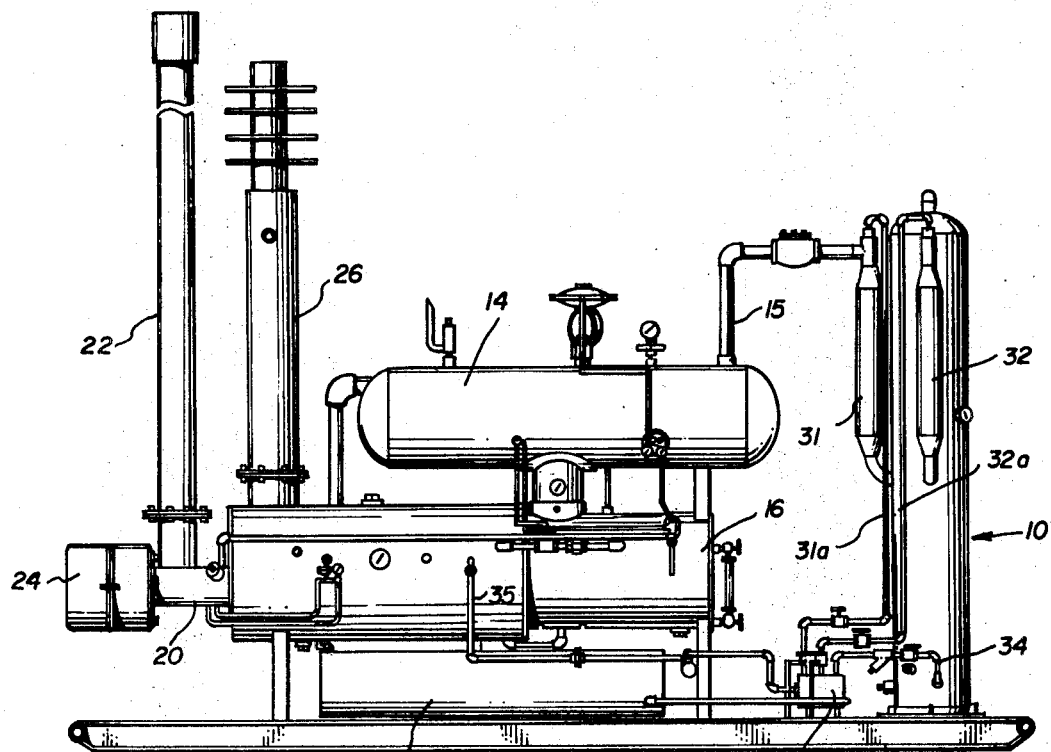
FIG. 1 is a side elevational view of a typical installation of a dehydrator, separator and reboiler, skid mounted and ready for field use.
Figure 2:
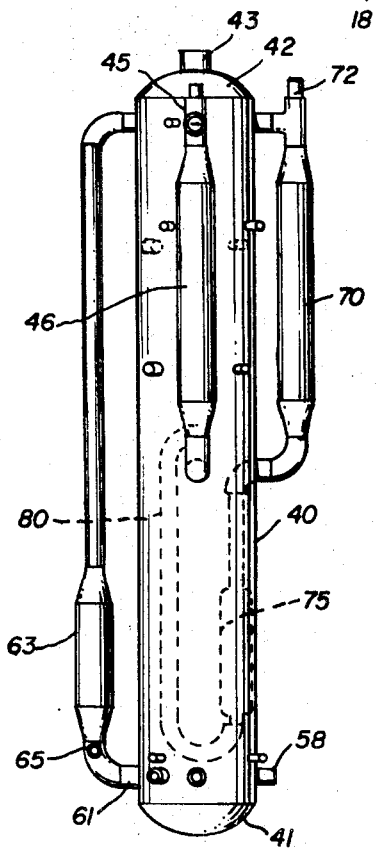
FIG. 2 is front elevational view of a dehydrator according to the invention.
Figure 3:
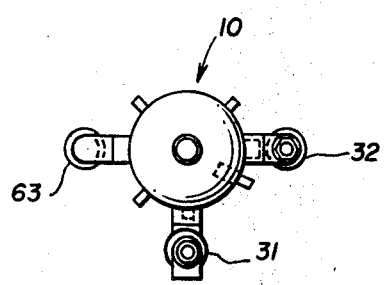
FIG. 3 is top plan view of the dehydrator of FIG. 1.
Figure 4:
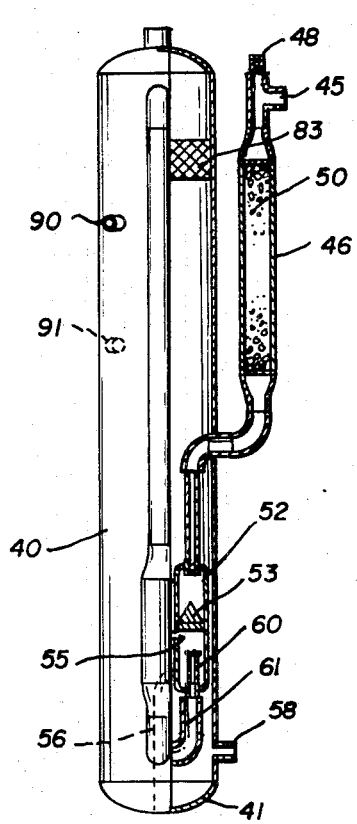
FIG. 4 is a side elevational view, partially cut-away, of the dehydrator of FIG. 2.
Figure 5:
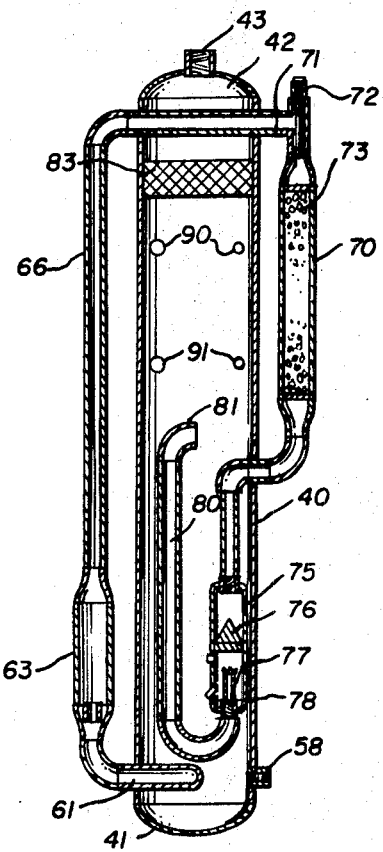
FIG. 5 is a front elevational view, partially cut-away, of the dehydrator of FIG. 2.

A complete unit for field installation is illustrated in FIG. 1. A dehydrator unit, identified by general numeral 10 is mounted in upright position on a skid 12. A gas-liquid mixture from a well enters a high pressure separator 14, which may be conventional, is mounted above a reboiler 16, which is, likewise, mounted on the skid 12. A heat exchanger 18 is mounted below the reboiler 16. A fire tube 20 extends into the reboiler 16, and it exhausts through a fire tube stack 22. A mixer nozzle 24 provides a combustible mixture of off gas and air for the fire tube. Mounted on and in communication with the reboiler 16 is still column 26 for fractionating the liquid, water rich dehydrating agent from the dehydrator 10. A double acting piston pump 30 introduces the dehydrating liquid into the two contactor units 31 and 32 through lines 31a and 32a respectively from the pump 30. A liquid dehydrator agent return line 34 is connected with the pump from the bottom of shell 10 for pumping the liquid agent back into the reboiler through line 35.

Figure 6:
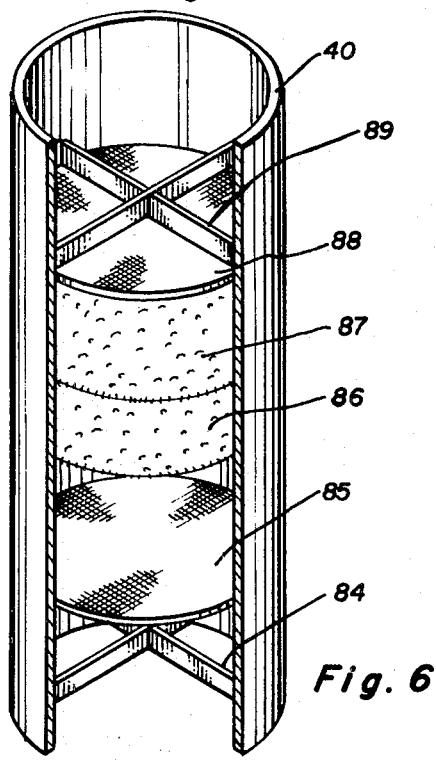
FIG. 6 is an enlarged detail view of a mist extractor used in the dehydrator according to the invention.
Figure 7:
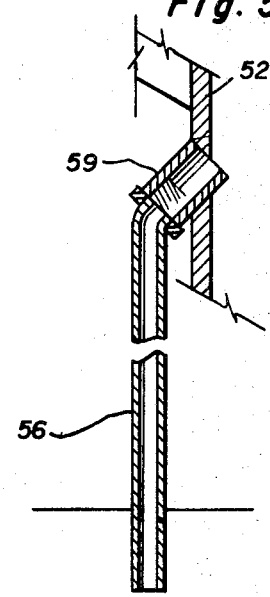
FIG. 7 is an enlarged detail view, in section, of a liquid overflow from one of the separators of a contactor-separator of the dehydrator of the invention.

The contactor-separator unit of the invention is illustrated in detail in FIGS. 2–7, wherein a contactor-separator includes a tubular shell 40 having dished heads 41 and 42. The head 42 is provided with an outlet 43 for exhaust of dehydrated gas. Gas, which exhausts from the high pressure separator 14 passes through the line 15 into an inlet 45 above a first contactor 46. The unit is similar to the one identified by numeral 10 and the contactors 31 and 32 are similar to contactors 46 and 70. A stream of dehydrating agent, commonly glycol, from line 31a enters the inlet 48, FIG. 4, and it flows concurrently with the gas from the gas inlet 45 through packing 50 in the contactor element or column 46. The packing in the contactor column 46 is random packed pall rings or other similar material to provide a large surface for the contact of the glycol and the gas. The mixture flows concurrently downwardly through the column 46 and enters a separator 52 inside the shell 40. The mixture of glycol and gas passes a deflector 53, which induces a circulatory movement to the mixture forming in effect a centrifugal separator. Glycol is thrown out in the separator 52 and it is discharged from the separator through overflow tube 56 into the bottom of the shell 40 which provides a sump for collecting rich glycol. A vent 55 may be used if desired. The glycol accumulated in the sump of the shell 40 exhausts through an outlet 58, through line 34 into the pump and then into the reboiler. As shown in FIG. 7, the glycol overflow from separator 52 includes a reduced orifice formed by inserting a pipe 56 into a reducer nipple 59 which is secured into the wall of separator 52. The gas in the separator exhausts through a nozzle 60 into a pipe 61 and upwardly into a vertical separator 63. The gas passes through an orifice at the bottom of the enlarged section of separator 63 providing a velocity change to the gas for a separation of liquid. The glycol which is separated out of the vertical separator 63 is released by outlet 65, FIG. 2, into the glycol system. The gas passes upwardly through the vertical separator 63 and through a line 66, FIG. 5, into a second contactor 70 through inlet 71. Glycol is introduced into the second contactor 70 through the top inlet 72 from the line 32a. As in the column 46, the contactor element or column 70 is packed with pall rings 73 and gas entering the column passes concurrently with the glycol down the contactor column and into another separator 75, which is, likewise, internally mounted in the shell 40. The mixture passes a deflector 76 which gives it a centrifugal motion separating glycol by centrifugal action. The separated glycol exhausts through an orifice 78 in a manner similar to that from the separator 52. The gas is released from the separator through a nozzle 77 into a pipe 80 and exhausts through an elbow 81 into the shell 40. The glycol which is separated out by the separator 75 is released into the shell 40 along with the glycol from the first separator 52. The gas being released from the elbow 81 impinges on the wall of the shell 40 which causes a change in direction and the release of gas into the larger chamber of the shell 40 provides an additional separation stage for any carry-over glycol. The dry gas then passes up through a mist extractor 83, and subsquently out through the outlet 43.

The mist extractor is shown in detail in FIG. 6, wherein cross-straps 84 which may be secured to the shell 40 or frictionally held in place supports a sheet of punched and expanded metal 85 on which rests a mist extractor with elements 86 and 87. Another plate of punched and expanded metal 88 held in place by straps 89 secures the mist extractor elements in place in the shell. The mist extractors may be stainless steel wool or the like to provide a filtering action for filtering out any entrained glycol. A series of openings 90 and 91, usually threaded or having welded-on nipples, provide means for insertion of pressure gauges, thermometers and the like as desired by the operator.

In a particular operation on a well in the San Juan Basin, a unit according to FIG. 1 was installed on the well flowing at 115° F. from a two inch line. The glycol usuage from the dehydrator was less than one pound per million cubic feet of gas. The circulation of the glycol into each of the columns was maintained at about four pound per pound of water in the gas per hour of flow. The dew point of the gas from the outlet 43 over a period of several months was consistently at plus nine degrees Fahrenheit or lower. At one period of time it was discovered that the unit was not operating completely properly, but the dew point of the gas at thet outlet was still at a plus 9° F.

Further, during the operation, it was determined that slugs of liquid were carried over into the contactor-separator a number of times. The unit, however, continued to operate in the same manner as when no slug was present. In another instance, where foaming in the process equipment had been a problem with other separators on a particular well, the unit of the invention operated effectively since the entire shell wall is available for the foam carry-over. The reduced velocity of the gas after exhausting from the outlet 80 into the shell provides sufficient time for breaking of the foam and no carry-over of foam was discovered in the line.

For a two inch gas line, columns of 4″ pipe and two feet long provide excellent contact between gas and liquid. Similar prortions are satisfactory on a scale up to larger production lines from a well.

In some instances the second contactor and separator may be dispensed with, and still obtain excellent results in the dehydration, showing the high efficiency of the contactor-separator combined with the separator shell and mist extractor.

While the invention has been illustrated by reference to a particular embodiment, there is no intent to limit the spirit or scope of the invention to the precise details so set forth except as defined in the following claims.

I claim:

1. Gas treatment apparatus comprising a vertical shell providing a sump for collected liquid and having liquid outlet means from adjacent the bottom thereof; a first gas-liquid contactor having an upper wet gas inlet and a lower outlet; a first gas-liquid separator mounted in said shell having its upper inlet communicating with the outlet of said first gas-liquid contactor and having a gas-liquid deflector and below said deflector a separated gas outlet and a separated liquid discharge outlet exhausting into said sump in said shell; a second gas-liquid contactor outside said shell having an inlet and an outlet and having its inlet in communication with the said separated gas outlet from said first separator; a second gas-liquid separator mounted in said shell having its inlet in communication with the outlet of said second contactor and having a centrifugal gas-liquid deflector and below said deflector, a separated liquid discharge outlet exhausting into said sump in said shell and a separated gas discharge outlet exhausting into said shell; said separated gas discharge outlet from said second separator being directed toward the side wall of said shell for impingement thereon; a mist extractor downstream from said gas discharge outlet in said shell; a dry gas discharge outlet from said shell downstream from said mist extractor; and means for injecting an absorbent liquid into each of said gas-liquid contactors for concurrent flow contact with the gas therein through said contactors and into said separators.

2. Gas treatment apparatus according to claim 1 wherein said gas-liquid separator is of a centrifugal type.

3. Gas treatment apparatus according to claim 1 wherein a velocity change separator is mounted in the line between said first gas-liquid separator and said second gas-liquid contactor.

4. Gas treatment apparatus according to claim 1 wherein said gas-liquid contactors are packed columns.

5. Gas treatment apparatus according to claim 1 wherein said gas-liquid contactors are packed columns arranged for a concurrent flow of gas and liquid therein.

6. Gas treatment apparatus comprising a first liquid separator for separating carried liquid from a gas; the gas treatment apparatus of claim 1 having a pair of series mounted absorbent liquid-gas contactors each followed by a separator, for gas exhausting from said first separator; a reboiler for concentrating liquid absorbent including means for heating said reboiler; a second separator downstream from said dehydrator; a common sump for collecting absorbent liquid from each of said following separators in said dehydrator and from said second separator; and pump means for passing absorbent liquid from said sump to said reboiler and concentrated liquid from said reboiler in a bifurcated stream to said two series mounted gas-liquid contactors.

References Cited
UNITED STATES PATENTS

| | | | |
|---|---|---|---|
| 3,094,574 | 6/1963 | Glasgow et al. | 55—31 X |
| 3,173,771 | 3/1965 | Barrett et al. | 55—92 |
| 3,212,238 | 10/1965 | Welch et al. | 55—174 X |
| 3,288,448 | 11/1966 | Patterson et al. | 55—257 X |

REUBEN FRIEDMAN, Primary Examiner

R. W. BURKS, Assistant Examiner

U.S. Cl. X.R.

55—31, 206; 159—31